United States Patent
Ryon et al.

(10) Patent No.: US 12,070,760 B2
(45) Date of Patent: Aug. 27, 2024

(54) FLUID DISTRIBUTOR PASSAGES

(71) Applicant: Collins Engine Nozzles, Inc., West Des Moines, IA (US)

(72) Inventors: Jason Ryon, Carlisle, IA (US); Gregory A. Zink, Des Moines, IA (US)

(73) Assignee: COLLINS ENGINE NOZZLES, INC., Des Moines, IA (US)

( * ) Notice: Subject to any disclaimer, the term of this patent is extended or adjusted under 35 U.S.C. 154(b) by 315 days.

(21) Appl. No.: 16/518,196

(22) Filed: Jul. 22, 2019

(65) Prior Publication Data
US 2021/0023574 A1 Jan. 28, 2021

(51) Int. Cl.
*B05B 1/34* (2006.01)

(52) U.S. Cl.
CPC .................................... *B05B 1/341* (2013.01)

(58) Field of Classification Search
CPC .......... B05B 1/34; B05B 1/3405; B05B 1/341
USPC ........ 239/472, 474, 486, 487, 489, 500, 501
See application file for complete search history.

(56) References Cited

U.S. PATENT DOCUMENTS

| | | | |
|---|---|---|---|
| 3,779,466 A * | 12/1973 | Majkrzak | F01K 7/16 239/489 |
| 8,418,468 B2 | 4/2013 | McMahan et al. | |
| 9,644,844 B2 | 5/2017 | Prociw | |
| 2011/0247590 A1 | 10/2011 | Donovan | |
| 2015/0103863 A1* | 4/2015 | Herman | G01K 13/028 374/138 |
| 2017/0050242 A1 | 2/2017 | Melton | |
| 2017/0350598 A1 | 12/2017 | Boardman et al. | |
| 2017/0363294 A1 | 12/2017 | Grooms et al. | |
| 2018/0142894 A1 | 5/2018 | Stytsenko et al. | |
| 2018/0156126 A1 | 6/2018 | Snyder | |
| 2018/0202365 A1 | 7/2018 | Hanson | |
| 2018/0283692 A1 | 10/2018 | Ryon et al. | |

FOREIGN PATENT DOCUMENTS

| | | |
|---|---|---|
| DE | 102017216595 A1 | 3/2019 |
| EP | 3006831 A1 | 4/2016 |
| EP | 3076083 A1 | 10/2016 |
| EP | 3109548 A1 | 12/2016 |
| EP | 3336432 A1 | 6/2018 |
| EP | 3336434 A1 | 6/2018 |
| GB | 375569 A | 6/1932 |

(Continued)

OTHER PUBLICATIONS

Extended European Search Report dated Jun. 26, 2020, issued during the prosecution of European Patent Application No. EP 19214670.2.

(Continued)

*Primary Examiner* — Christopher S Kim
(74) *Attorney, Agent, or Firm* — Kinney & Lange, P. A.

(57) ABSTRACT

A fluid distributor includes a distributor body defining a plurality of fluid distributor passages therethrough. Each of the fluid distributor passages winds in swirl direction about a swirl axis. The swirl direction defines a swirl angle of at least 60 degrees relative to the swirl axis. Each of the fluid distributor passages defines a floor and opposed ceiling, and an opposed pair of sidewalls. At least one of the floor and/or the ceiling is vaulted to define a surface that is angled less than 60 degrees relative to the swirl axis.

10 Claims, 10 Drawing Sheets

(56) References Cited

FOREIGN PATENT DOCUMENTS

WO 2016/156868 A1 10/2016
WO 2019078921 A1 4/2019

OTHER PUBLICATIONS

Extended European Search Report dated Jun. 2, 2023, issued during the prosecution of European Patent Application No. EP 23161256.5.
Extended European Search Report dated Jun. 5, 2023, issued during the prosecution of European Patent Application No. EP 23161324.1.
EP Communication Pursuant to Art. 94(3) EPC, dated Aug. 16, 2023, issued during the prosecution of European Patent Application No. EP 19214670.2.

* cited by examiner

FLUID DISTRIBUTOR PASSAGES

BACKGROUND OF THE INVENTION

1. Field of the Invention

The present disclosure relates to fluid distributors, and in particular to fluid distributors for fuel manifolds and injection nozzles for gas turbine engines.

2. Description of Related Art

In injectors such as gas turbine engine fuel injectors, it is often desirable to have a high swirl angle where fluid exits the injector. It is also advantageous to employ additive manufacturing processes to the production of injectors. However, additive manufacturing processes have limitations that designers must avoid exceeding. One example is that conventional additive manufacturing techniques limit how great a swirl angle can be imposed in an additively manufactured injector.

The conventional techniques have been considered satisfactory for their intended purpose. However, there is an ever present need for improved systems and methods for fluid distributor passages such as in injectors. This disclosure provides a solution for this need.

SUMMARY OF THE INVENTION

A fluid distributor passage is produced by a process of additively manufacturing a floor, ceiling, and opposed sidewalls of the fluid distributor passage using a build direction. At least one of the floor and/or the ceiling define a swirl angle greater than 60 degrees relative to the build direction.

A method includes additively manufacturing a fluid distributor passage along a build direction. The fluid distributor passage winds along a swirl path around a swirl axis that is aligned with the build direction. The swirl path is angled at a swirl angle greater than 60 degrees relative to the build direction.

The swirl angle can be greater than 80 degrees relative to the build direction. The swirl angle can be greater than 88 degrees relative to the build direction. A ceiling of the swirl path can be self-supported without removable support structure during additively manufacturing the swirl path.

A fluid distributor includes a distributor body defining a plurality of fluid distributor passages therethrough. Each of the fluid distributor passages winds in swirl direction about a swirl axis. The swirl direction defines a swirl angle of at least 60 degrees relative to the swirl axis. Each of the fluid distributor passages defines a floor and opposed ceiling, and an opposed pair of sidewalls. At least one of the floor and/or the ceiling is vaulted to define a surface that is angled less than 60 degrees relative to the swirl axis.

Both of the ceiling and floor can be vaulted in the same direction, wherein the distributor passage has a chevron cross-sectional shape in radial cross-section relative to the swirl axis. Both of the ceiling and floor can be vaulted but in opposite directions.

The fluid distributor passages can be in fluid communication to feed a pressure atomizer. The distributor passages can be in fluid communication with an annular outlet within an air blast atomizer. The air blast atomizer can include one or both of an inner air passage radially inboard of the distributor passages, and/or an outer air passage radially outboard of the distributor passages. The distributor passages can be liquid fuel passages and a plurality of gaseous fuel distributor passages can be included, each of the gaseous fuel distributor passages winding in a gas swirl direction about the swirl axis, wherein the gas swirl direction defines a gas swirl angle of at least 60 degrees relative to the swirl axis, each of the gaseous fuel distributor passages defining a floor and opposed ceiling, and an opposed pair of sidewalls, wherein at least one of the floor and/or the ceiling is vaulted to define a surface that is angled less than 60 degrees relative to the swirl axis. The gaseous fuel distributor passages can be radially inboard of the liquid fuel passages. The liquid fuel passages and gaseous fuel distributor passages can all feed into a single annular outlet orifice.

The swirl angle can be 90 degrees relative to the swirl axis. The fluid distributor passages can define a conical profile. The ceiling can be vaulted from each sidewall. It is also contemplated that the ceiling can be vaulted from only one sidewall. The ceiling can be curved.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
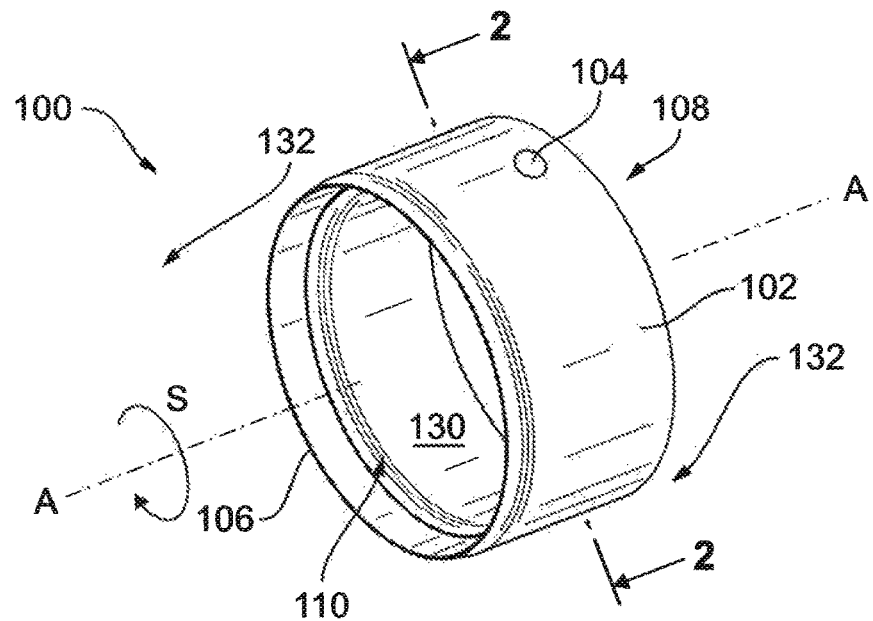
FIG. 1 is a schematic perspective view of an embodiment of a fluid distributor constructed in accordance with the present disclosure.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-17, as will be described to facilitate production of fluid distributors such as fuel injectors using additive manufacturing techniques.

The fluid distributor 100, e.g., for use as a fuel injector for a gas turbine engine or the like, includes a distributor body 102 defining a liquid inlet 104 and a liquid outlet 106, which in FIG. 1 is in the form of an annular outlet orifice. An air inlet 108 and air outlet 110 are included for atomizing air flow used to atomize a spray of liquid from the liquid outlet 106, and a separate air swirler (not shown) can be nested within the fuel swirler of the distributor body 102.

Figure 2:
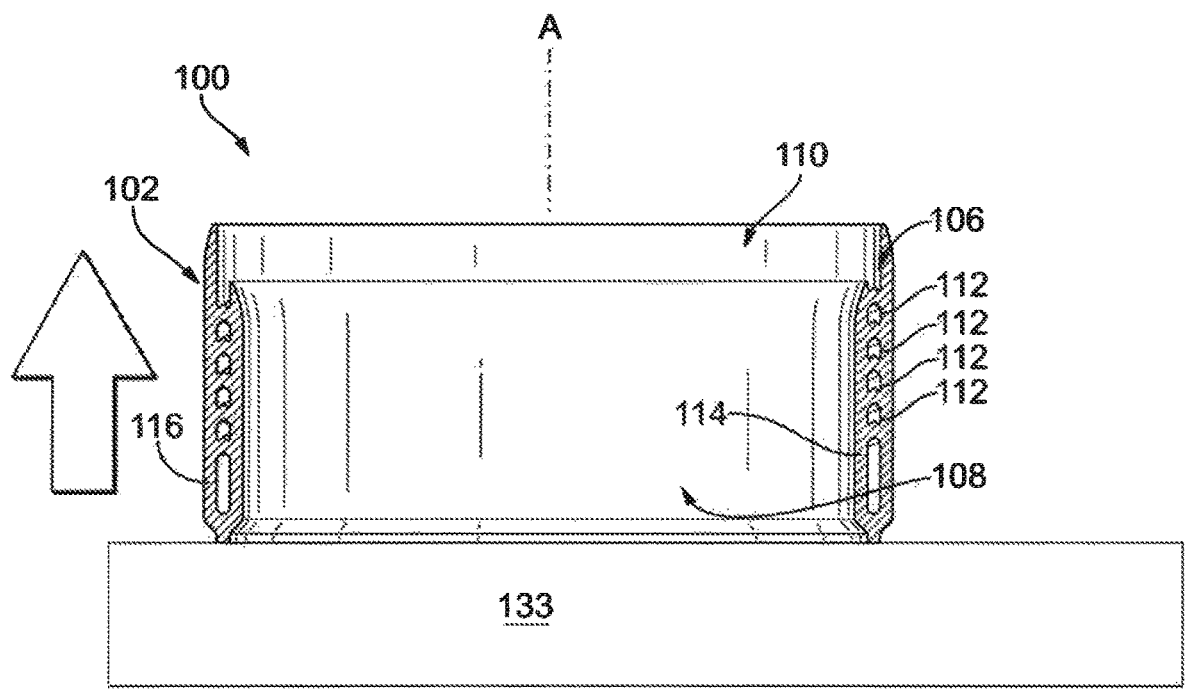
FIG. 2 is a cross-sectional side elevation view of the injector of FIG. 1, showing fluid distributor passages.
Figure 5:
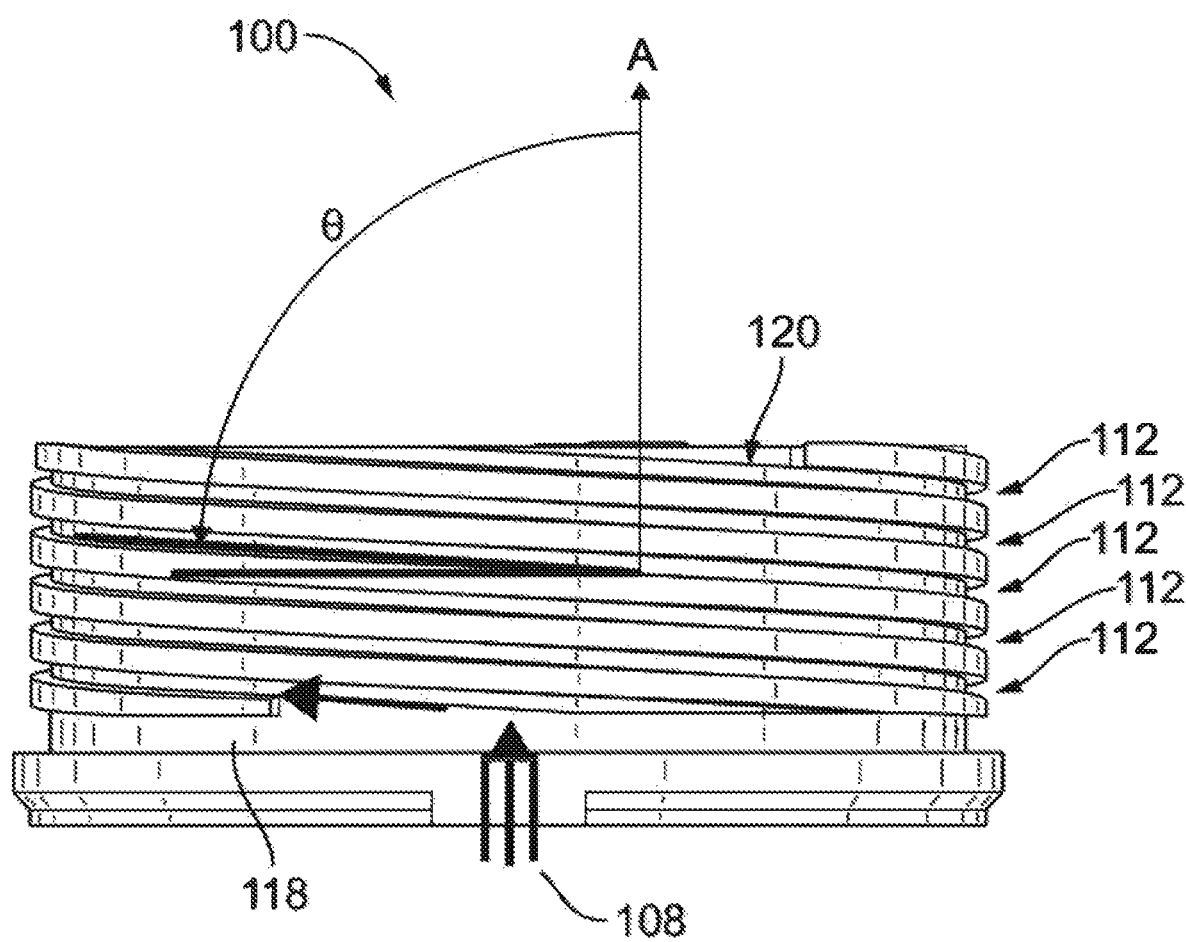
FIG. 5 is a side elevation view of a portion of the fluid distributor of FIG. 1, showing the fluid distributor passages with the outer sidewall removed.

With reference now to FIG. 2, the distributor body 102 defines a plurality of fluid distributor passages 112 winding therethrough. The passages 112 are defined between an inner sidewall 114 and an outer sidewall 116. In FIG. 5, the outer sidewall 116 is shown removed from view so the winding of the passages 112 can be seen. Each of the fluid distributor passages 112 winds in swirl direction S (indicated in FIG. 1) about a swirl axis A, and the swirl direction defines a swirl angle θ of at least 60 degrees relative to the swirl axis A. The angle θ is the bulk angle, e.g. along which fluid would travel in one of the passages 112, taken at any position in one of the passages 112. The two flow arrows in FIG. 5 indicate the entrance of liquid through the liquid inlet 104, and the passage of liquid from an entrance plenum 118 into one of the passages 112. Each passage 112 has a passage outlet 120 that feeds in fluid communication into the annular chamber of the liquid outlet 106 (labeled in FIGS. 1-2). The fluid distributor 100 can be part of an air blast atomizer that includes one or both of an inner air passage 110 radially inboard of the distributor passages 112, and/or an outer air passage 132 radially outboard of the distributor passages 112 (as indicated by the reference characters in FIG. 1).

Figure 3:
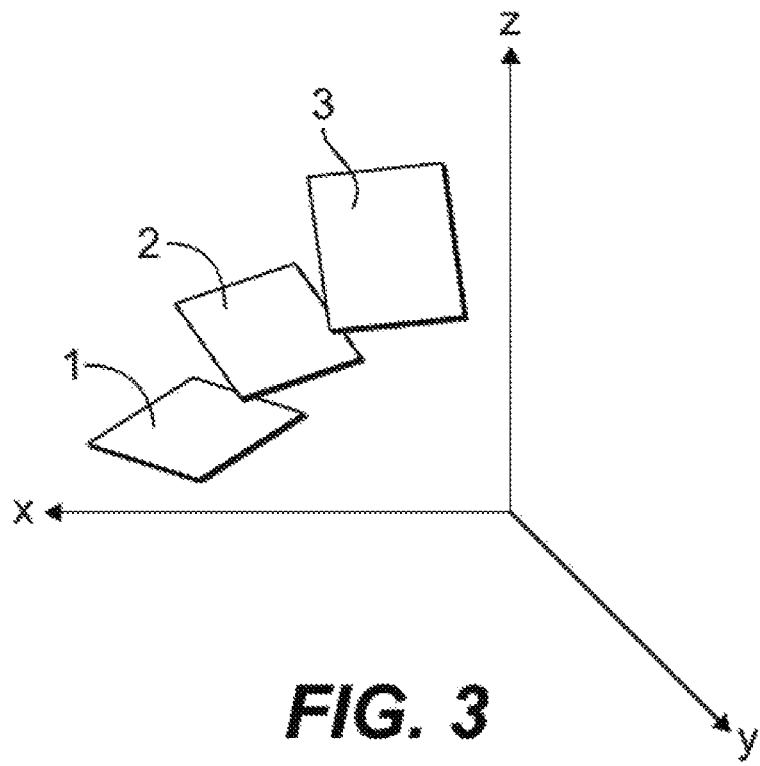
FIG. 3 is a schematic perspective view of fluid distributor passage surfaces angled relative to an axis.
Figure 4:
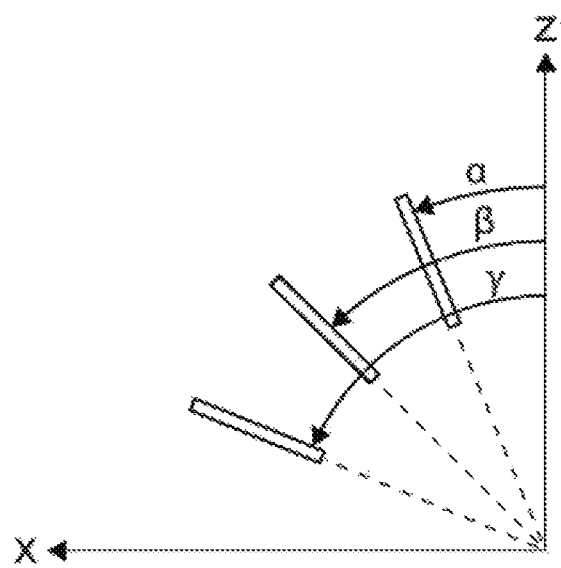
FIG. 4 is a side elevation view of the surfaces of FIG. 3, showing the angles of the surfaces relative to the vertical axis.

FIGS. 3-4 show three surfaces 1, 2, and 3 in perspective and in side elevation, respectively. In the side elevation of FIG. 4, it is clear that the surfaces 1, 2, and 3 are angled relative to the axis Z by angles α, β, and γ. Those skilled in the art will readily appreciate that all surfaces, even curved surfaces, have a local angle relative to the z-axis. The local angle of the surfaces of the flow passages 112 in FIG. 5 is different from the bulk swirl angle θ of the passage itself. This allows swirl angle θ to be greater than 80 degrees relative to the build direction (indicated in FIG. 2 relative to the build plate 133). It is contemplated that this can allow for swirl angles θ greater than 88 degrees relative to the build direction, e.g. allowing the ceiling 123 (described below) of a fluid distributor passage 112 to be self-supporting during the build with good surface quality. The floor 125 and ceiling 123 are named according to their relative position with respect to the direction of gravity during a build, e.g., wherein the build direction is aligned with the direction of gravity, however after a build is complete, the floor 125 is not required to remain below the ceiling 123, since the completed build can be oriented as needed.

Figure 6:
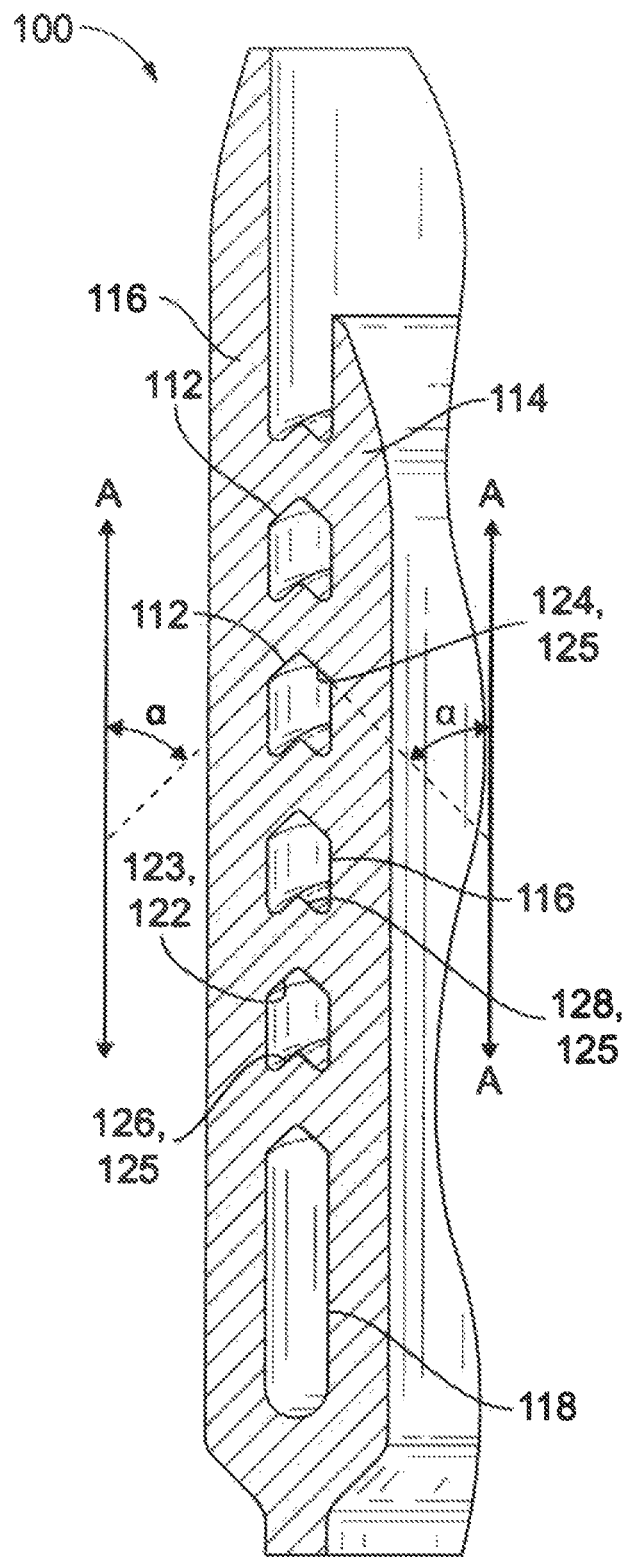
FIG. 6 is a cross-sectional side elevation view of a portion of the fluid distributor of FIG. 2, showing the vaulted ceiling and floor of each fluid distributor passage.

With reference now to FIG. 6, each of the fluid distributor passages defines a ceiling 123 including two surfaces 122 and 124 and an opposed floor 125 including two surfaces 126 and 128, wherein the ceiling 123 and floor 125 are disposed between the opposed pair of sidewalls 116, 114. Each of ceilings 123 is vaulted into the two constituent surfaces 122, 124 to define a local surface that is angled locally at an angle a that is less than 60 degrees relative to the swirl axis A (those skilled in the art will readily appreciate that the swirl axis A is moved off center and shown in two different positions in FIG. 6 for convenience of labeling the angle a for two different ceiling surfaces 122 and 124). Both of the ceiling 123 and floor 125 are vaulted in the same direction, wherein the distributor passages 112 each has a chevron cross-sectional shape in radial cross-section relative to the swirl axis A.

Figure 7:
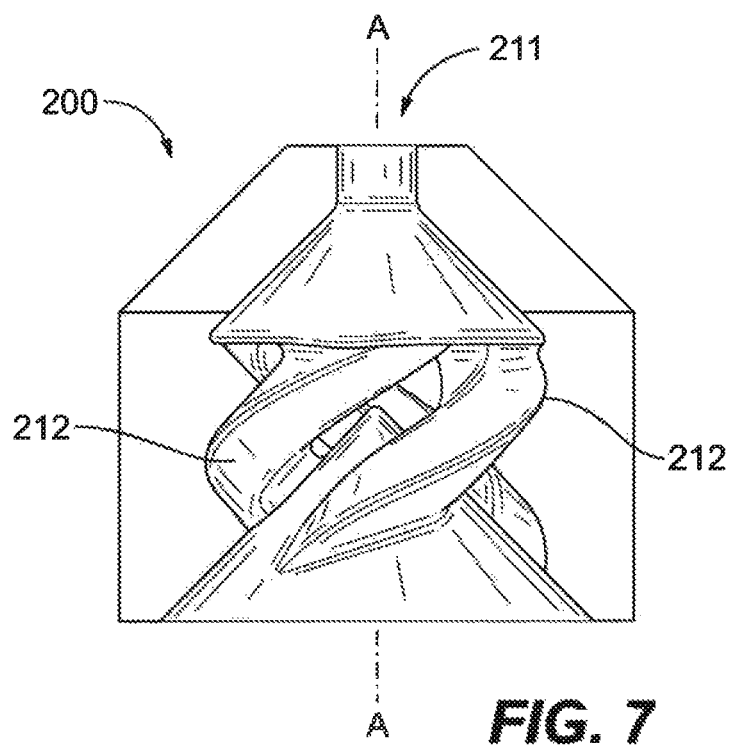
FIG. 7 is schematic view of an embodiment of a pressure atomizer constructed in accordance with the present disclosure, schematically showing the negative space of the fluid distributor passages as a solid.
Figure 8:
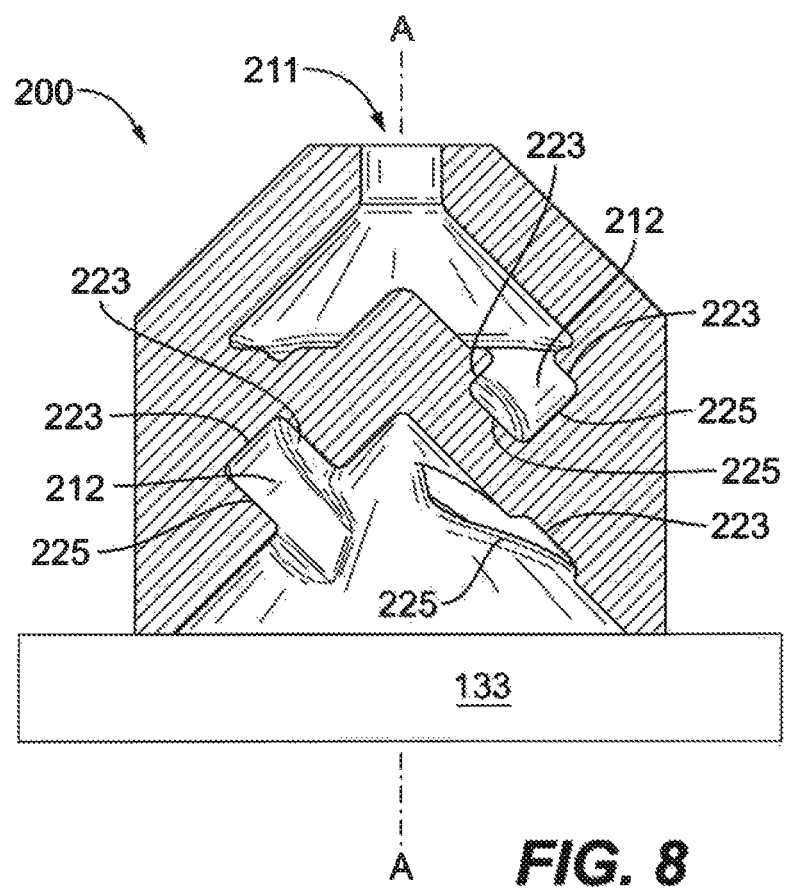
FIG. 8 is a cross-sectional side elevation view of the pressure atomizer of FIG. 7, showing the vaulted floor and ceiling in the fluid distributor passages vaulted different directions.

With reference now to FIG. 7, a fluid distributor 200 is shown having fluid distributor passages 216 that are in fluid communication to feed a pressure atomizer 211. In FIG. 7, the negative space of the fluid distributor passages 216 and pressure atomizer 211 are shown as solid forms for sake of clarity. As shown in cross-section in FIG. 8, in the passages 216 both of the ceiling 223 and floor 225 are vaulted but in opposite directions, so the passages 216 have a diamond cross-sectional shape relative to the axis A.

Figure 9:
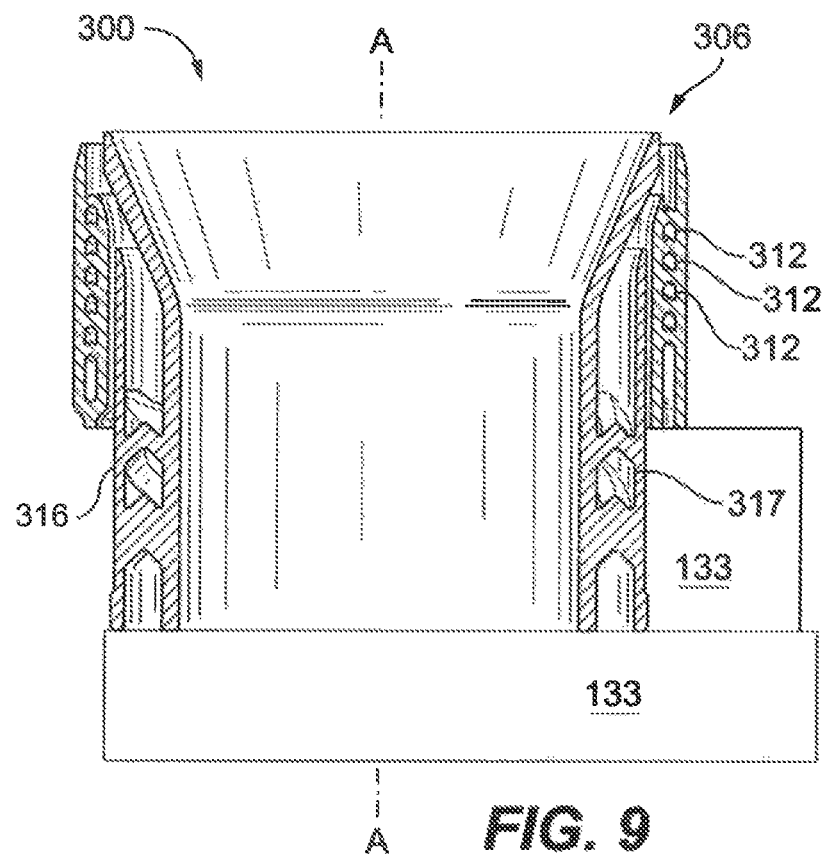
FIG. 9 is a cross-sectional side elevation view of a dual fuel injector constructed in accordance with the present disclosure, showing the different sizes of fluid distributor passages for liquid and gaseous fuel.
Figure 10:
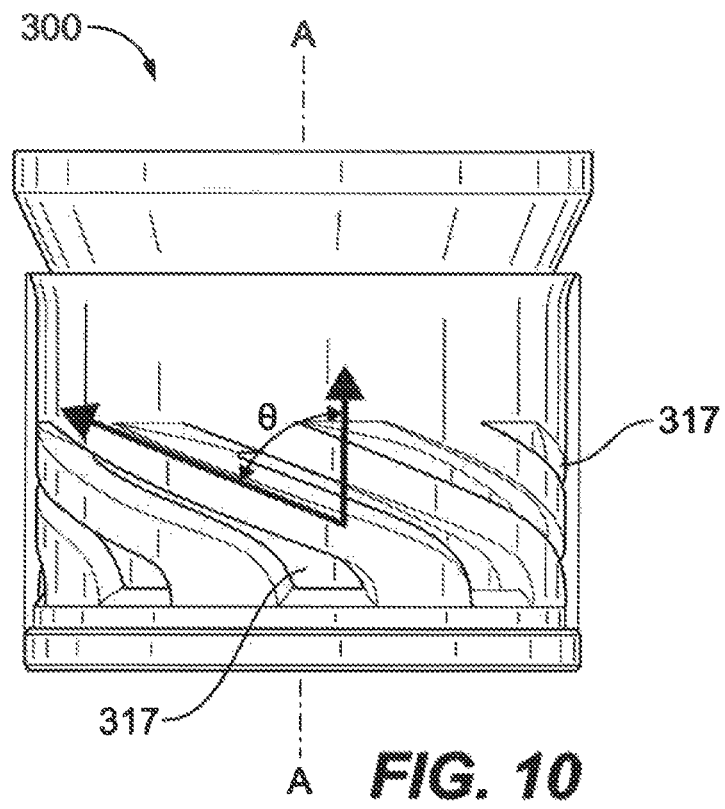
FIG. 10 is a schematic side-elevation view of the injector of FIG. 9, showing the fluid distributor passages with the outer sidewall removed.

Referring now to FIG. 9, a fluid distributor 300 is shown having fluid distributor passages 312, 317 that all feed into a single annular outlet orifice 306. In FIG. 10, the fluid distributor passages 317 are shown with the outer sidewall 316 removed for sake of clarity. The distributor passages 312 are liquid fuel passages, and are configured with the same chevron cross-sectional shape as passages 112 described above. The distributor passages 317 are a plurality of gaseous fuel distributor passages. Each of the gaseous fuel distributor passages 317 winds in a gas swirl direction about the swirl axis A, wherein the gas swirl direction defines a gas swirl angle θ (identified in FIG. 10) of at least 60 degrees relative to the swirl axis A. Much as described above with respect to passages 112 and 312, each of the gaseous fuel distributor passages 317 defines a floor and opposed ceiling, and an opposed pair of sidewalls, wherein at least one of the floor and/or the ceiling is vaulted to define a surface that is angled less than 60 degrees relative to the swirl axis. The gaseous fuel distributor passages 317 are radially inboard of the liquid fuel passages 312. This configuration allows for dual fuel operation where liquid and/or gaseous fuel can be injected from the single annular outlet orifice 306.

Figure 11:
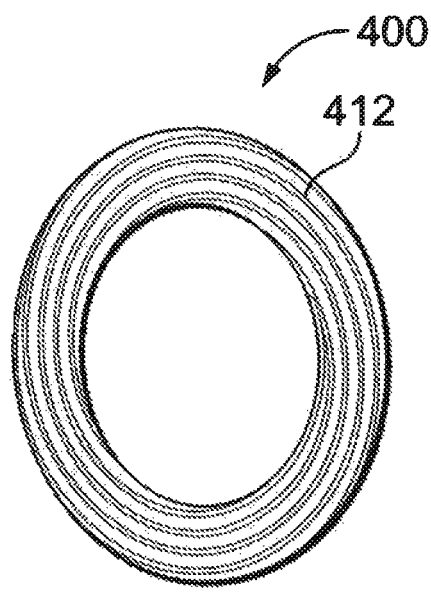
FIG. 11 is a schematic perspective view of a portion of a fluid distributor constructed in accordance with the present disclosure, showing a plurality of fluid distributor passages defining a flat profile.
Figure 12:
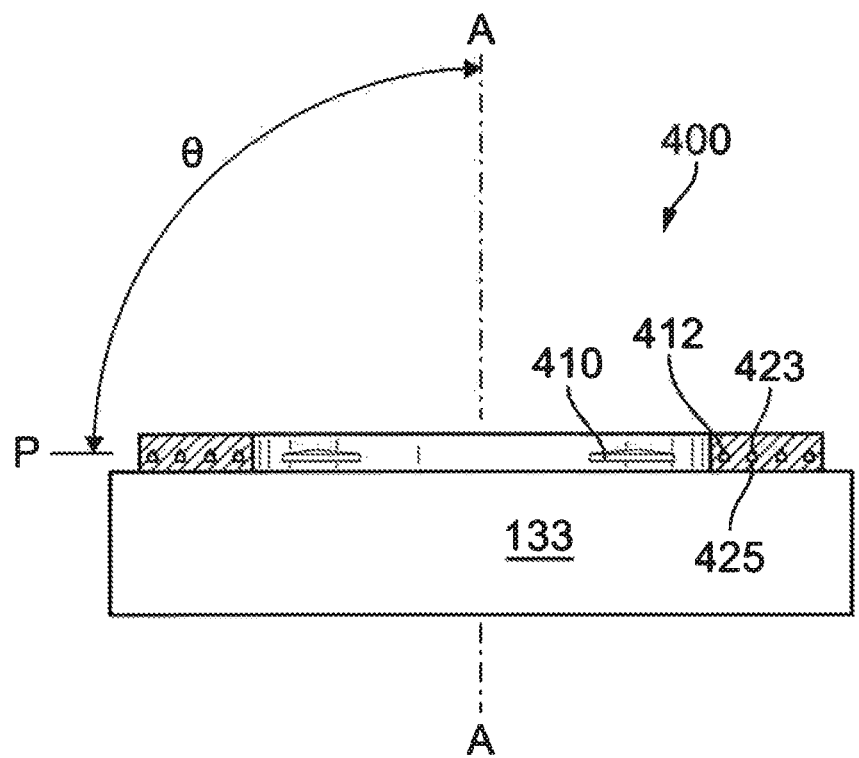
FIG. 12 is a cross-sectional side elevation view of the fluid distributor of FIG. 11, showing the cross-sections of the fluid distributor passages.
Figure 13:
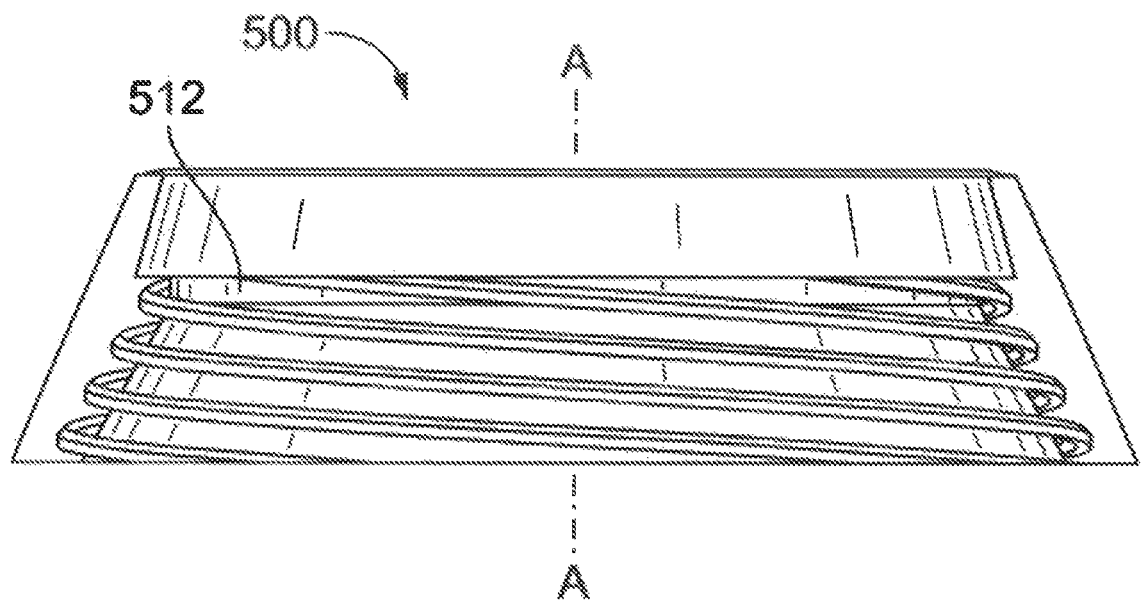
FIG. 13 is a schematic perspective view of a portion of a fluid distributor constructed in accordance with the present disclosure, showing a plurality of fluid distributor passages in defining a conical profile.
Figure 14:
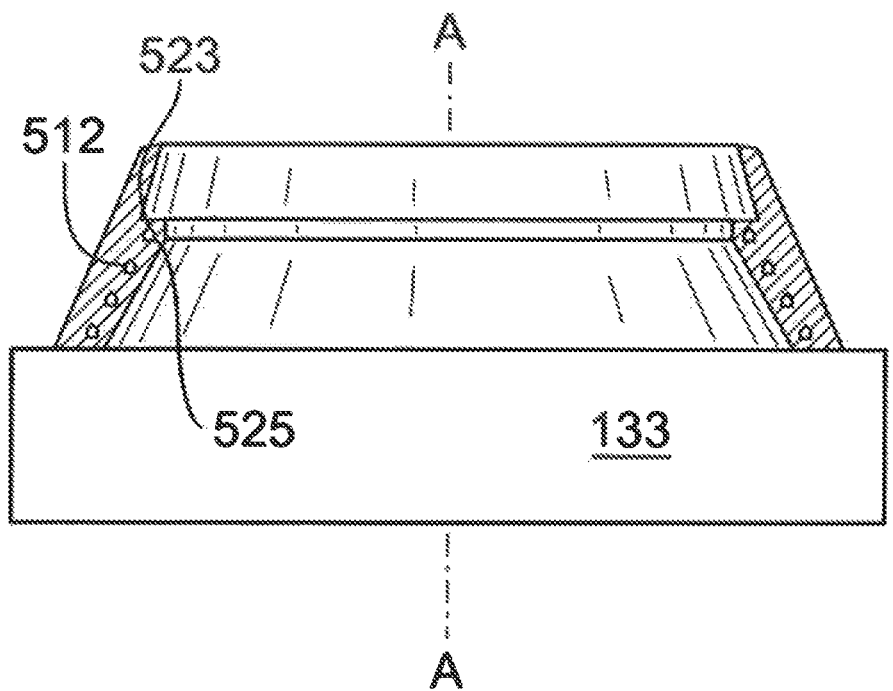
FIG. 14 is a cross-sectional side elevation view of the fluid distributor of FIG. 13, showing the cross-sections of the fluid distributor passages.
Figure 15:
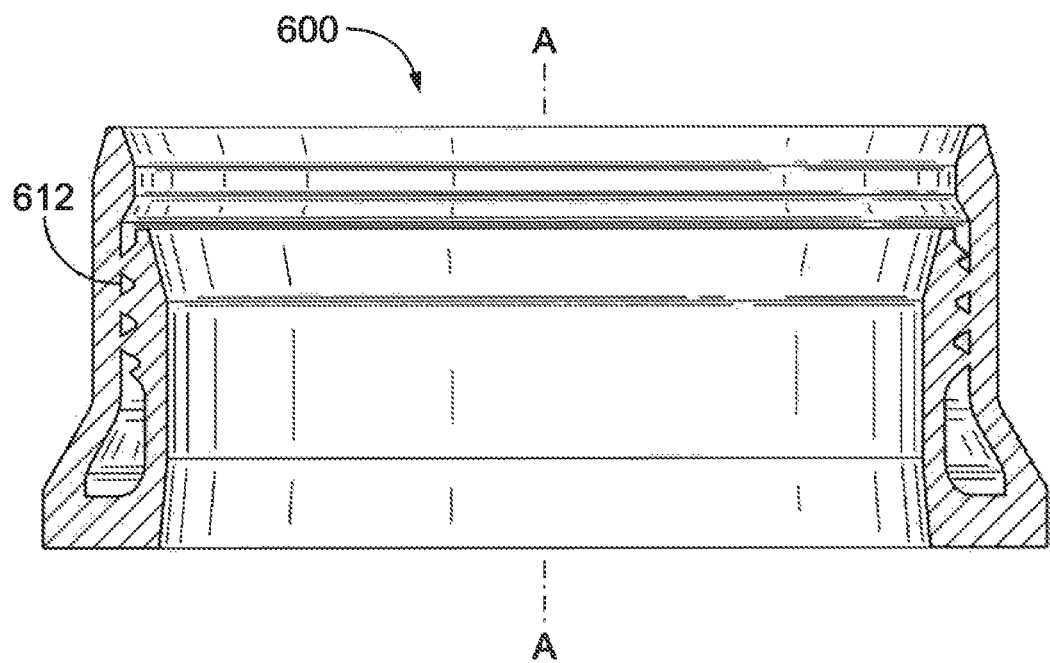
FIG. 15 is a cross-sectional side elevation view of a fluid distributor constructed in accordance with the present disclosure, showing fluid distributor passages where the ceiling is vaulted from only one sidewall.
Figure 16:
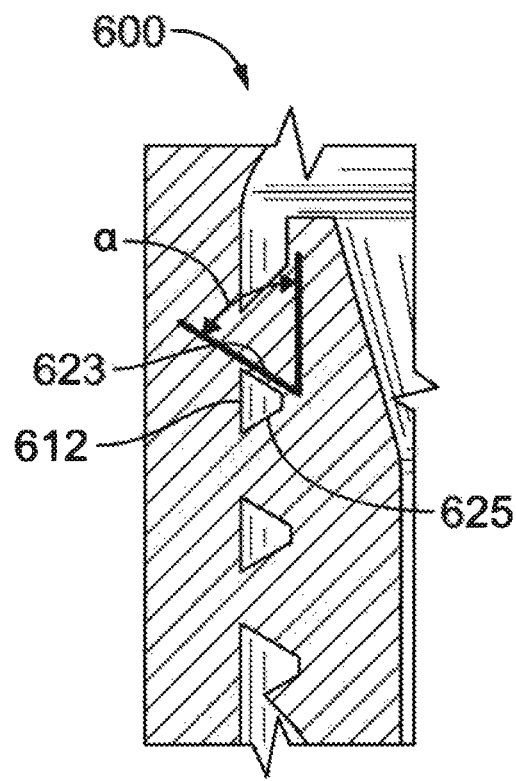
FIG. 16 is a cross-sectional side-elevation view of the fluid distributor of FIG. 15, indicating the local surface angle of the ceiling of the fluid distributor passages.
Figure 17:
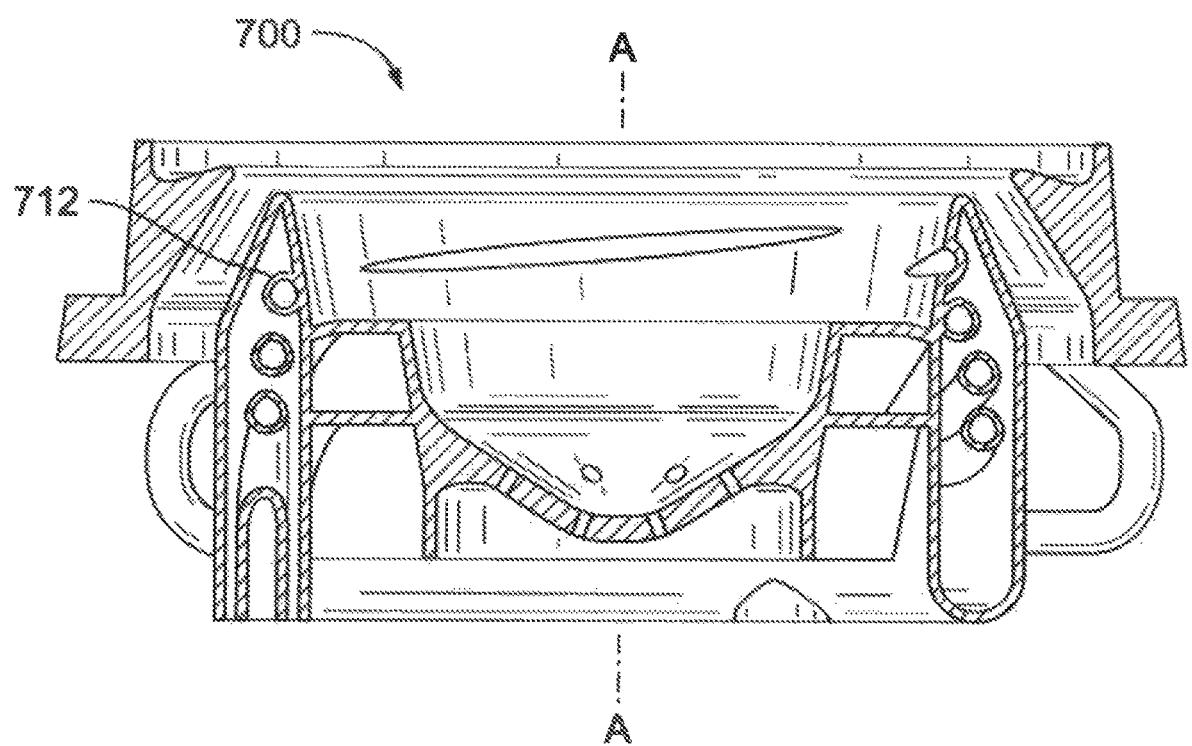
FIG. 17 is a cross-sectional side-elevation view of a fluid distributor constructed in accordance with the present disclosure, showing fluid distributor passages with ceilings that are curved.

In FIGS. 11 and 12, another fluid distributor 400 is shown, wherein the swirl angle θ is fully 90 degrees relative to the swirl axis A, wherein the fluid distributor passages 412 spiral inward in a common plane P to outlets 410. In FIGS. 13 and 14, the fluid distributor passages 512 of the fluid distributor 500 define a conical profile relative to the swirl axis A. In FIGS. 11-14, the ceilings 423, 523 are each vaulted from each respective sidewall, but the floors 425, 525 are not vaulted. In the fluid distributor 600, each distributor passage 612 has a ceiling 623 and floor 625 that vaulted from only one sidewall, i.e. there is only one respective vaulted surface in each of the ceiling 623 and floor 625. In certain applications, such as certain size scales and materials, as shown in FIG. 17 for fluid distributor 700, it is possible for the ceiling and or floor of the distributor passages 712 to be curved, i.e., the vaulting of the ceiling and optionally the floor follows a curve, e.g., for an egg shaped cross-sectional shape of the passages 712. In each of the foregoing examples, the vaulting of the ceiling and optionally floors in the fluid distributor passages allows for the local angle α to not exceed the limits of a given additive manufacturing process, will allowing swirl angles θ that exceed that limit.

A method includes additively manufacturing a fluid distributor passage, e.g. passages 112, along a build direction, e.g., build direction indicated by the arrow in FIG. 2. The fluid distributor passage winds along a swirl path around a swirl axis, e.g., swirl axis A that is aligned with the build direction. The swirl path is angled at a swirl angle, e.g., swirl angle θ greater than 60 degrees relative to the build direction. The fluid distributor passage can be produced by a process of additively manufacturing a floor (e.g. floor 125), ceiling (e.g. ceiling 123), and opposed sidewalls (e.g. sidewalls 114, 116) of the fluid distributor passage using a build direction. At least one of the floor and/or the ceiling define a swirl angle greater than 60 degrees relative to the build direction. The ceiling of the swirl path can be self-supported without removable support structure during additively manufacturing the swirl path. While shown and described as used for fuel passages, those skilled in the art will readily appreciate that passages as disclosed herein can be used for air passages as well. For example, in FIG. 9, the passages 317 could be used as an air swirler.

The methods and systems of the present disclosure, as described above and shown in the drawings, provide for facilitated production of fluid distributors such as fuel injectors using additive manufacturing techniques, and this can expand the design space for which additive manufacturing processes can be used. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fluid distributor comprising:
a distributor body defining a plurality of fluid distributor passages therethrough, each of the fluid distributor passages winding in swirl direction about a swirl axis, wherein the swirl direction defines a swirl angle of at least 60 degrees relative to the swirl axis, each of the fluid distributor passages defining a floor and opposed ceiling, and an opposed pair of sidewalls that are straight and parallel with one another in a radial cross-section relative to the swirl axis, wherein at least one of the floor and/or the ceiling is vaulted in a plane that includes the swirl axis to define a surface that is angled less than 60 degrees relative to the swirl axis, wherein both of the ceiling and floor are vaulted in a same direction as each other, wherein the distributor passage has a chevron cross-sectional shape in the radial cross-section relative to the swirl axis.

2. The fluid distributor as recited in claim 1, wherein the fluid distributor passages are in fluid communication to feed a pressure atomizer.

3. The fluid distributor as recited in claim 1, wherein the swirl angle is 90 degrees relative to the swirl axis.

4. The fluid distributor as recited in claim 1, wherein the fluid distributor passages define a conical profile.

5. The fluid distributor as recited in claim 1, wherein the ceiling is vaulted from each sidewall.

6. An apparatus comprising:
a fluid distributor including a distributor body defining a plurality of fluid distributor passages therethrough, each of the fluid distributor passages winding in swirl direction about a swirl axis, wherein the swirl direction defines a swirl angle of at least 60 degrees relative to the swirl axis, each of the fluid distributor passages defining a floor and opposed ceiling, and an opposed pair of sidewalls that are straight and parallel to one another in a radial cross-section relative to the swirl axis, wherein at least one of the floor and/or the ceiling is vaulted in a plane that includes the swirl axis to define a surface that is angled less than 60 degrees relative to the swirl axis, wherein both of the ceiling and floor are vaulted in a same direction as each other, wherein the distributor passage has a chevron cross-sectional shape in the radial cross-section relative to the swirl axis, wherein the distributor passages are in fluid communication with an annular outlet, wherein the annular outlet is within an air blast atomizer.

7. The apparatus as recited in claim 6, where the air blast atomizer includes one or both of:
an inner air passage radially inboard of the distributor passages; and/or an outer air passage radially outboard of the distributor passages.

8. The fluid distributor as recited in claim 6, wherein the distributor passages are liquid fuel passages, and further comprising:
a plurality of gaseous fuel distributor passages each of the gaseous fuel distributor passages winding in a gas swirl direction about the swirl axis, wherein the gas swirl direction defines a gasswirl angle of at least 60 degrees relative to the swirl axis, each of the gaseous fuel distributor passages defining a floor and opposed ceiling, and an opposed pair of sidewalls, wherein at least one of the floor and/or the ceiling is vaulted to define a surface that is angled less than 60 degrees relative to the swirl axis.

9. The fluid distributor as recited in claim 8, wherein the gaseous fuel distributor passages are radially inboard of the liquid fuel passages.

10. The fluid distributor as recited in claim 8, wherein the liquid fuel passages and gaseous fuel distributor passages all feed into a single annular outlet orifice.

* * * * *